United States Patent [19]
Konrad

[11] 3,890,549
[45] June 17, 1975

[54] PULSE CONTROL SYSTEM POWER CIRCUIT

[75] Inventor: Charles Edward Konrad, Roanoke, Va.

[73] Assignee: General Electric Company, Salem, Va.

[22] Filed: Apr. 1, 1974

[21] Appl. No.: 456,465

[52] U.S. Cl. .................. 318/246; 318/139; 318/341
[51] Int. Cl. ............................................. H02p 5/16
[58] Field of Search ........... 318/138, 139, 246, 341, 318/439

[56] References Cited
UNITED STATES PATENTS

| | | | |
|---|---|---|---|
| 3,492,557 | 1/1970 | Brown | 318/341 |
| 3,624,475 | 11/1971 | Smith | 318/341 |
| 3,803,472 | 4/1974 | Konrad | 318/341 |
| 3,826,959 | 7/1974 | Anderson | 318/139 |

Primary Examiner—Robert K. Schaefer
Assistant Examiner—W. E. Duncanson, Jr.
Attorney, Agent, or Firm—W. C. Bernkopf; J. H. Beusse

[57] ABSTRACT

A power circuit for DC-to-DC pulse control or chopper systems. A pair of unidirectional conduction devices are each connected to a common end of a capacitor; one device couples the capacitor across a DC load, while the other couples it across both the load and a main thyristor used to couple the load to a source of DC potential.

A first one of the unidirectional conduction devices is arranged to allow current to flow to the capacitor through an inductance. The inductance induces an overcharge upon the capacitor which is subsequently applied to the main thyristor, by way of the second unidirectional conduction device, to procure the commutation of the main thyristor.

10 Claims, 3 Drawing Figures

3,890,549

PULSE CONTROL SYSTEM POWER CIRCUIT

BACKGROUND OF THE INVENTION

The present invention relates to pulse control systems, and more particularly to DC pulse control systems of the type utilizing a capacitor for periodically commutating a main thyristor.

The problem of metering DC power to a DC load in a continuously-variable fashion has long been a sought after desideratum. In one prior art approach, a plurality of resistances were inserted between a DC load and a source of DC potential, and the resistances selectively switched in or out of the circuit to vary the effective voltage applied to the load. Due to I²R losses in the resistors and the abrupt changes in applied power this approach, though simple, was inefficient. With the availability of the thyristor and more particularly the silicon controlled rectifier or SCR a new approach, termed pulse control, has become feasible.

Pulse controlled DC power systems operate a thyristor in the manner of a rapidly-actuated switch. By varying the average percentage of time that the thyristor is conductive, the average power applied to a load may be varied correspondingly. In order to provide smooth operation, it is necessary to operate the thyristor at an extremely high rate such that the inherent characteristics of the drive system, i.e., inductance, inertia, etc. serve to integrate or smooth the pulses of electrical power.

While an SCR may withstand substantial forward bias without becoming conductive, and has the ability to remain nonconductive prior to the application thereto of a gating pulse, once it becomes conductive it will continue to conduct until current there through is interrupted by means of an outside mechanism. That is, the SCR as presently known is a gate turn-on, but not a gate turn-off device. For this reason in DC control systems separate circuitry must be provided in order to extinguish or commutate the SCR. It will be apparent that when used in AC systems, the natural reversal of potential occurring each cycle effects automatic commutation of the SCR.

D. C. commutation systems commonly make use of auxiliary SCR's and/or diodes to provide current paths which allow a capacitor to be charged from the power source. The natural inductance of the power source leads, or additional inductance inserted into the circuit in series with the capacitor, causes the voltage accruing upon the capacitor to "overshoot" so that it charges to some value above the source potential. The unidirectional conduction device utilized to charge the capacitor then becomes back-biased, and another current path is enabled which allows the charge accrued upon the capacitor to reverse. Here again, additional inductance may be provided in the circuit to aid the resonant reversal of the stored charge upon the capacitor. The reversed charge thus accrued upon the capacitor is subsequently applied to the main thyristor and provides a reverse bias thereacross to extinguish the current flow therethrough, and thus commutate the thyristor.

In most modern-day commutation systems the commutating capacitor is forward-charged while coupled in shunt with the main thyristor. After charge reversal, means are activated to couple the capacitor across the main thyristor to effect commutation. However, occasionally a main thyristor will "shoot through" and fail to commutate. In such a situation, the continued conduction of the main thyristor effectively shunts the charging circuit and thus frustrates further attempts at commutating the main thyristor.

In order to obviate this problem, circuits have been designed which monitor the activity of the main thyristor and automatically disable the main power circuit should the main thyristor remain conductive for an undue period of time. However, such circuits necessarily add expense and complexity to the system and further necessitate a temporary shutdown of the system to allow the capacitor to be recharged. It will therefore be appreciated that it would be desirable to provide a commutation circuit for a pulse control system which will continue to operate should a commutation failure of the main thyristor occur.

It is therefore an object of the present invention to provide an improved power circuit for a DC pulse control system.

It is a further object of the invention to provide a commutating circuit for a DC pulse control system which will not be disabled by prolonged conduction of a main thyristor.

It is another object of the invention to provide an improved commutating circuit for a DC pulse control system which is capable of repeatedly back-biasing a main thyristor despite the continued conductivity of the thyristor.

SUMMARY OF THE INVENTION

Briefly stated, in accordance with one aspect of the invention the foregoing objects are achieved by providing first and second unidirectional conducting means which are inversely poled, and coupled to a common side of a capacitor. The series combination of the capacitor and one of the unidirectional conducting means is connected in parallel with a DC load, while the other unidirectional conducting means serves to couple the capacitor across a source of DC potential. A main thyristor is provided for coupling the load to the source of DC voltage, along with a gating control for repeatedly switching the main thyristor into conduction to meter power to the load. The capacitor is initially charged, by way of one the last-mentioned unidirectional conducting means, to a voltage greater than that of the power supply. The net difference in potential is then applied to the main thyristor by way of the other unidirectional conducting means. The capacitor then reverse-biases the main thyristor by way of the latter unidirectional conducting means to effect commutation of the main thyristor.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiments taken in conjunction with the accompanying drawing in which:

DESCRIPTION OF A PREFERRED EMBODIMENT

Figure 1:
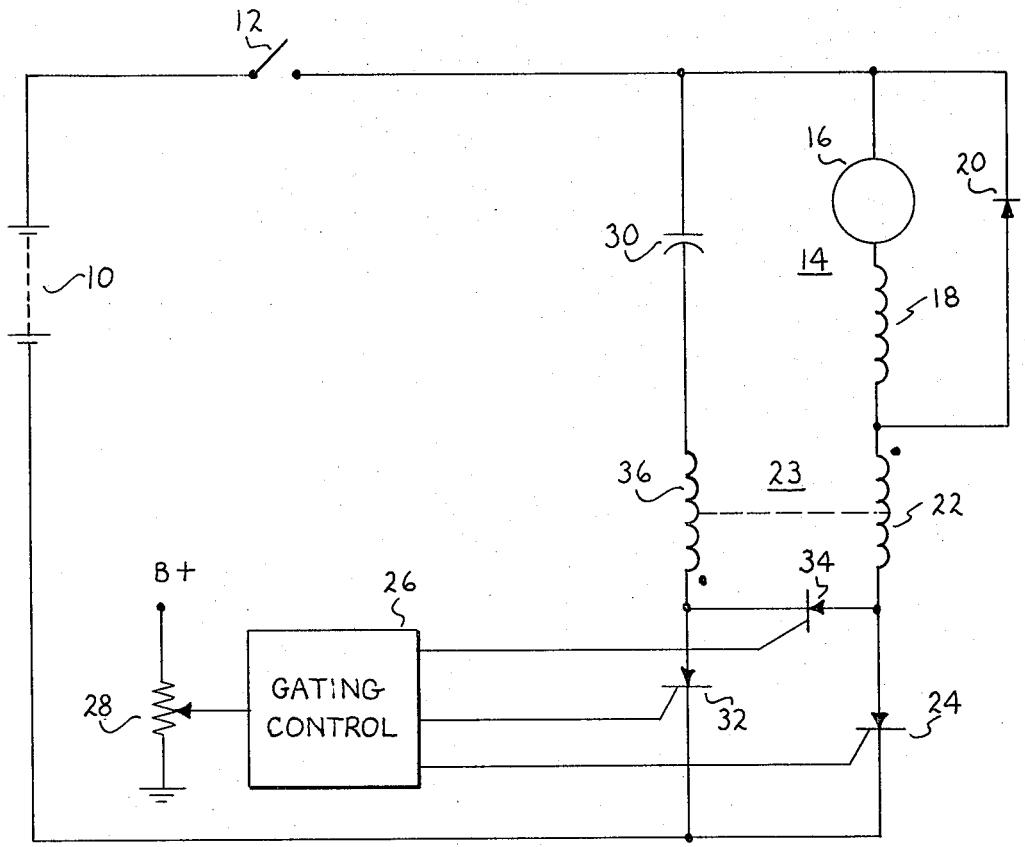
FIG. 1 is one embodiment of a pulse control circuit embodying principles of the present invention.

In FIG. 1 there are shown the principal elements of a switched regulating or pulse control system. A DC power source such as battery 10 provides current which flows through a master switch 12 to a DC motor 14. The motor depicted is of the series type and comprises an armature 16 and field winding 18. Although the load shown is a series-wound motor, it will be understood that the present invention is adaptable for use with various other DC loads. A flyback diode 20 is provided in shunt with motor 14, for purposes to be explained hereinafter.

The lower terminal of motor 14 is linked through an primary winding 22 of transformer 23 and a main thyristor 24, herein shown as an SCR, to the lower terminal of battery 10. A gating control 26 supplies pulses for repetitively enabling a main thyristor 24 at a rate responsive to a control voltage derived from potentiometer 28, which may comprise a manually-adjustable speed control.

As is well known by those skilled in the art thyristors such as SCR 24 are not self-commutating, i.e., they will continue to conduct after the cessation of an enabling signal at the gate thereof so long as current flow is maintained through the SCR. In order to extinguish or commutate the SCR, it is necessary to either interrupt current flow thereto or to reverse-bias the thyristor so that current flow is caused to cease. For this reason a commutating circuit is provided which includes a commutating capacitor 30, a first unidirectional conducting device 32, herein shown as an SCR, and a second unidirectional conducting device 34, also shown as an SCR. Secondary winding 36 of transformer 23 is advantageously coupled in circuit with SCR 32 for purposes to be explained hereinafter.

In order to apply power to motor 14 master switch 12 is closed, and a gating signal applied to the main SCR 24 from gating control 26. As will be recognized by those skilled in the art gating control 26 may comprise one or more oscillators whose frequencies vary in response to an applied control signal. By gating SCR 24 on at a more rapid rate, or equivalently, by maintaining the rate of gating constant but delaying the activity of elements in the commutating circuit the average conductive-to-nonconductive time of SCR 24, hereinafter referred to as the mark-space ratio, may be increased. The mark-space ratio of main SCR 24 then determines the percentage of available battery voltage which appears across the terminals of motor 14.

At the time that the main SCR 24 is gated on, or some time thereafter, gating control 26 also supplies a gating pulse to SCR 32. Capacitor 30, secondary winding 36 and SCR 32 now comprise a continuous charging circuit which allows charge from battery 10 to produce a positive-going voltage upon the upper plate of capacitor 30.

At the same time, current from battery 10 flows through motor 14 and primary winding 22 by way of main SCR 24. The transformer action due to the coupling of primary and secondary windings 22 and 36, respectively, in transformer 23 induces a voltage across the terminals of winding 36 which causes capacitor 30 to be charged to some voltage above that of battery 10.

When capacitor 30 has attained its maximum potential, the decay of energy in secondary winding 36 and the resulting tendency for resonant reversal of the charge back-biases and thus commutates SCR 32. However, main SCR 24 is unaffected by this activity and remains conductive, maintaining current flow through armature 16 and field winding 18 of motor 14.

It will now be appreciated that, except for a negligible resistive drop in the conductor coupling battery 10 to capacitor 30, the upper terminals of the battery and capacitor are at substantially the same voltage. However, since the voltage to which capacitor 30 has been charged is substantially in excess of that of battery 10, the lower plate thereof will be at a negative potential with respect to the lower terminal of the battery. When gating control 26 applies a gating pulse to SCR 34 the voltage then appearing at the anode of main SCR 24 will be substantially lower than the voltage appearing at the cathode thereof. This effectively reverse-biases main SCR 24 and extinguishes the flow of current therethrough.

The above-described activity effects commutation of the main SCR, subsequent to which the reversal of charge of capacitor 30 continues until the energy in the circuit loop is exhausted. Current flow through motor 14, however, continues due to the presence of flyback diode 20 which constitutes a short circuit path for current induced by the decay of inductive energy in the windings of the motor. Subsequently, depending upon the setting of potentiometer 28, gating control 26 applies another enabling pulse to the gate of main SCR 24 to re-institute the conduction/commutation process.

In some pulse control system applications aberrant conditions are encountered which result in failures or inconsistent operation of certain portions of the circuit. For instance, one popular application of pulse control systems is for controlling the operation of an electrical vehicle. In such an environment the operation of electrical accessories, the sudden opening and closing of switches in auxiliary circuits or even the close proximity of radio-frequency apparatus gives rise to abrupt discontinuities in the voltages appearing throughout the system. Such signals, commonly termed "noise", are occasionally of sufficient magnitude to cause the improper operation of certain portions of the motor control circuit. For instance, should a sudden voltage spike appear upon a lead coupling gating control 26 to the gate terminals of one of the illustrated thyristors the thyristor might be enabled at an inopportune time. Should the discontinuity or noise be of sufficient magnitude, it could cause a sudden forward voltage to be applied across an otherwise non-conducting thyristor to cause the thyristor to go into conduction absent a gating signal. Although such improper operation is not necessarily detrimental to the successful operation of the circuit, in certain circumstances it could result in a loss of control. For instance, should it occur that due to improper gating of SCR 32 the initial voltage accrued across capacitor 30 is less than some minimum value, insufficient voltage would then be present to effect commutation of main SCR 24.

In prior art systems it has been common for the commutating capacitor to be connected essentially in shunt with the main thyristor, by means of auxiliary thyristors. In such a circuit, should improper or insufficient commutation fail to extinguish the main thyristor a continuously-conducting path would then be presented across the capacitor, preventing the subsequent accrual of charge upon the capacitor and thwarting further attempts at commutation. In order to avoid the destruction of the main thyristor in such a case it is necessary to provide additional circuitry for sensing the commutation failure and disabling the power circuit.

With the present invention, however, sporadic failures in commutation of the main SCR 24 do not disable the commutating circuit, and the circuit can make repeated attempts to commutate the thyristor. For instance, should a transient voltage signal prematurely gate SCR 32, effecting a diminished initial charge upon capacitor 30 such that insufficient voltage is present to commutate SCR 24, the latter will continue to conduct during the period when it is ordinarily extinguished. However, gating control 26 will continue to produce gating signals in accordance with the normal operation of the system. SCR 32 is subsequently enabled and capacitor 30 will again charge by way of winding 36 and SCR 32 in exactly the same manner as before, regardless of the continued conduction of the main SCR. When SCR 34 next conducts a negative potential will again be impressed upon the anode of main SCR 24 in order to achieve commutation thereof.

Rather than use SCR's for unidirectional conducting devices 32 and 34, in some applications it may be more economical to utilize a diode. Although the SCR offers the capability of controlling the activity of preselected portions of the commutating circuit the natural resonant period of the charging circuit may alternatively provide acceptable results.

Figure 2:
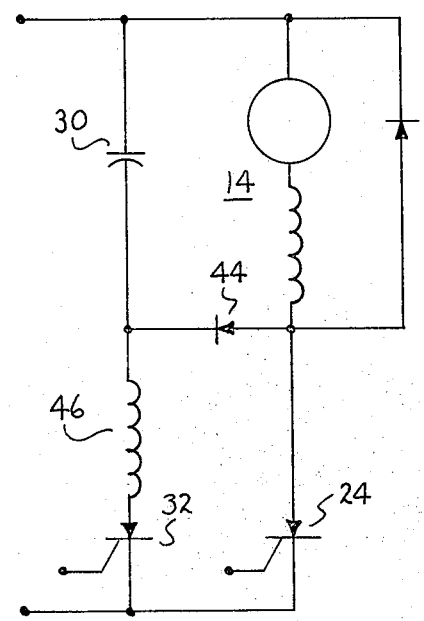
FIG. 2 is a portion of a pulse control circuit illustrating another embodiment of the invention.

Referring now to FIG. 2, there is shown one embodiment of the present invention in which SCR 34, used for commutating the main thyristor, is replaced by diode 44. In addition, rather than utilizing a transformer to achieve a voltage overshoot upon capacitor 30 an inductor 46 is provided in series with the capacitor and SCR 32.

Operation of the circuit of FIG. 2 is similar to that of FIG. 1. Initially, power is applied to the circuit from a suitable source of DC potential and a gating pulse is applied to the gate terminal of SCR 32. Current now flows through capacitor 30, inductor 46 and SCR 32 to afford charging of the capacitor. Due to the inherent characteristics of inductor 46, current continues to flow through capacitor 30 after the voltage of the capacitor attains a level equivalent to that of the source. When the inductive energy accrued in inductor 46 is fully dissipated, the charge accrued upon capacitor 30 tends to reverse. However, since the upper terminal of capacitor 30 is at substantially the same voltage of the upper terminal of the voltage source, the lower plate thereof is necessarily at a lower voltage than the lowermost terminal of the voltage source. This producing a reverse bias across SCR 32, effectively extinguishing it. At the same time, diode 44 is forward-biased so as to couple the lower plate of capacitor 30 to the intersection of motor 14 and main SCR 24.

This activity reverse-biases SCR 24 and causes it to be extinguished. It will be recognized that motor 14 affords a shunt path for the charge upon capacitor 30; however, the alternate path comprising the voltage source is adequate to achieve commutation of the main SCR. After the SCR is extinguished, it is anticipated that charge upon capacitor 30 will dissipate through the windings of motor 14.

In the event of a failure of commutation and the continued conduction of SCR 24, the subsequent energization of SCR 32 will again procure the charging of capacitor 30 and a recycling of the entire commutating process. This procedure can be repeated as many times as necessary realizing, however, that depending upon current levels it may not be possible to allow main SCR 24 to continue to conduct for an overly long period of time.

Figure 3:
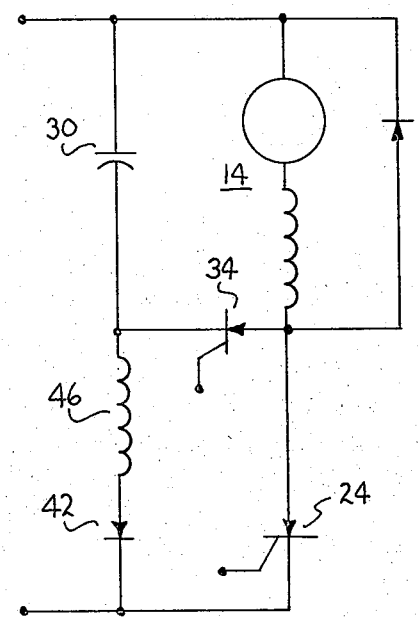
FIG. 3 shows still another embodiment of the invention.

FIG. 3 illustrates still another embodiment of the invention, wherein the SCR 32 of FIG. 1 has been replaced by a diode. In this embodiment, capacitor 30 begins to charge as soon as power is applied to the illustrated circuit. Due to the presence of inductor 46, as explained with respect to the foregoing Figure, capacitor 30 accrues a charge which is in excess of that of the voltage source. Once this overshoot voltage attains its maximum, the normal tendency toward resonant reversal in the charging circuit will back bias diode 42, isolating the capacitor from the rest of the circuit and maintaining the voltage accrued thereon.

When it is desired to commutate main SCR 24, a gating pulse is applied to SCR 34. SCR 34 then couples the anode of main SCR 24 to the lower plate of capacitor 30, effectively back-biasing main SCR 24 and extinguishing it. Subsequently to the commutation of the main SCR, capacitor charge is dissipated through the windings of motor 14 until the lower plate of capacitor 30 achieves a voltage slightly in excess of that of the cathode of diode 42. Diode 42 will then become forward biased and a charging process will commence once more.

Although it will be apparent that there is no control afforded by the system shown in FIG. 3 over the time at which capacitor 30 is charged, since diode 42 effectively isolates the capacitor thereafter full control of commutation time is maintained through the gating of SCR 34. It should be recognized that a transformer such as that depicted in FIG. 1 may be substituted for the inductor 46 of the present figure if necessary in order to obtain the requisite overshoot voltage upon capacitor 30. It will therefore be appreciated that certain aspects of the invention are not limited to particular details of the examples illustrated, and it is contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A pulse control power system for controllably metering power from a DC source to a load, comprising:
   a thyristor for coupling the load to a source of DC current;
   the series combination of a capacitor, inductive means, and a first unidirectional conducting means, said series combination being adapted to be coupled in parallel with said thyristor and the load;
   a second unidirectional conducting means for coupling said capacitor across the load, and poled in a direction opposite to that of said first unidirectional conducting means; and
   a gating control for periodically initiating conduction of said thyristor and for subsequently initiating the conduction of one of said unidirectional conducting means to effect commutation of said thyristor.

2. The invention defined in claim 1, wherein said inductive means comprises the secondary winding of the transformer, the primary winding of which being coupled in circuit with said thyristor.

3. The invention defined in claim 2, wherein said first unidirectional conducting means is an SCR and said second unidirectional conducting means is a diode, said SCR having the gate thereof coupled to said gating control.

4. The invention defined in claim 2, wherein said second unidirectional conducting means is an SCR, and said first unidirectional conducting means is a diode, said SCR having the gate thereof coupled to said gating control.

5. The invention defined in claim 1, wherein said first unidirectional conducting means is an SCR, and a second unidirectional conducting means is a diode, said SCR having the gate terminal thereof coupled to said gating control.

6. The invention defined in claim 1, wherein said second unidirectional conducting means is an SCR and said first unidirectional conducting means is a diode, said SCR having the gate thereof coupled to said gating control.

7. In a chopper circuit including a main SCR for switchably coupling a load to a source of DC current and a pulse generator for controlling the energization of the SCR, means for commutating the SCR comprising:

the series combination of a commutating capacitor, inductive means and first unidirectional conducting means, said series combination being coupled across a source of DC current;

a second series combination of said capacitor and a second unidirectional conducting means coupled across the load; and means for controllably initiating the conduction of one of said first or said second unidirectional conducting means.

8. The invention defined in claim 7 wherein said first unidirectional conducting means is a thyristor, and said second unidirectional coupling means is a diode.

9. The invention defined in claim 8 wherein said second unidirectional conducting means is a thyristor, said first unidirectional coupling means is a diode.

10. The invention defined in claim 7 further including a transformer, the secondary winding of which is comprised of said inductive means and the primary winding of which is coupled in circuit with the main SCR and the load.

* * * * *